United States Patent [19]

Iwamida

[11] Patent Number: 5,839,109
[45] Date of Patent: Nov. 17, 1998

[54] SPEECH RECOGNITION APPARATUS CAPABLE OF RECOGNIZING SIGNALS OF SOUNDS OTHER THAN SPOKEN WORDS AND DISPLAYING THE SAME FOR VIEWING

[75] Inventor: Hitoshi Iwamida, Kawasaki, Japan

[73] Assignee: Fujitsu Limited, Kawasaki, Japan

[21] Appl. No.: 250,433

[22] Filed: May 27, 1994

[30] Foreign Application Priority Data

Sep. 14, 1993 [JP] Japan ................................ 5-228990

[51] Int. Cl.$^6$ ........................................................ G10L 3/00
[52] U.S. Cl. .......................... 704/271; 704/236; 704/276
[58] Field of Search ................................. 395/2.4, 2.35, 395/2.45, 2.48, 2.52, 2.6, 2.8, 2.85, 2.42, 2.79, 2.69, 2.87, 154; 381/43, 48; 704/226, 231, 233, 236, 239, 243, 251, 260, 270, 271, 276, 278

[56] References Cited

U.S. PATENT DOCUMENTS 5,329,609  7/1994  Sanada et al. ........................... 395/2.6
5,359,695  10/1994  Ohora et al. ........................... 395/2.85

*Primary Examiner*—Kee M. Tung
*Attorney, Agent, or Firm*—Armstrong, Westerman, Hattori, McLeland & Naughton

[57] ABSTRACT

A speech recognition apparatus includes a sound pickup, a standard feature storage device, a comparing device, a display pattern storing device, and a display. The apparatus can display non-speech sounds either as a message or as an image, and is especially useful for hearing-impaired individuals. For example, if a fire engine siren is detected, the display can show a picture of a fire engine, or can display the message "siren is sounding".

6 Claims, 6 Drawing Sheets

Fig. 4A
SIREN IS SOUNDING
Fig. 4B
BABY IS CRYING
Fig. 4C
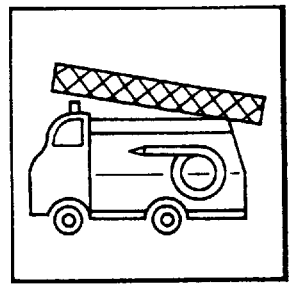
Fig. 4D

SPEECH RECOGNITION APPARATUS CAPABLE OF RECOGNIZING SIGNALS OF SOUNDS OTHER THAN SPOKEN WORDS AND DISPLAYING THE SAME FOR VIEWING

BACKGROUND OF THE INVENTION (1) Field of the Invention

The present invention relates to a speech recognition apparatus for automatically recognizing an input speech signal and displaying the result of the recognition for viewing, and more particularly to a speech recognition apparatus that is adapted to recognize signals of sounds, as well as signals of words as spoken by humans, and display such sound signals in visually recognizable form.

(2) Description of the Related Art

Speech recognition devices are beginning to be used in practical applications. In a typical speech recognition system, speech signals to be recognized are registered and stored in advance as standard patterns. An input speech signal is compared with these standard patterns and a standard pattern that provides the closest match is selected; when the degree of match is greater than a prescribed level, the input is recognized as being a speech sound corresponding to that standard pattern. To register a particular sound as a standard pattern, the standard pattern representing that particular sound must be entered. Usually, sounds that can be registered as standard patterns are limited to speech sounds that the user can input, but in some applications where abnormal sounds need to be recognized for automatic control of plants, etc., such abnormal sounds may be registered as standard patterns.

The result of the recognition of a speech signal may be output directly by assuming that the recognition has been done correctly, but to ensure the correctness of the recognition, it is standard practice to output a speech sound synthesized from the result of the recognition so that the speaker can verify it. Besides outputting a synthesized speech sound, the result of the recognition may be displayed as characters for verification; in any case, the method of verification is required to provide an accurate representation of the input speech signal. For this purpose, the speech recognition device is constructed to store spoken words as standard patterns and produce synthesized speech or character display for verification. When abnormal sounds are stored as standard patterns, as noted above, no verification is done since there is no need for verification of such sounds.

For communication with hearing-impaired people, sign language or writing is used. One potential use of the speech recognition device is to assist the hearing impaired in carrying out conversation with people having normal speech ability. In this case, the person having the normal speech ability speaks as usual, and his or her voice is recognized by means of the speech recognition device which displays the result of the recognition as characters for viewing by the hearing-impaired person.

The present invention is particularly suitable for a speech recognition apparatus used for such a purpose, but it is not limited to this particular purpose; for example, the invention is also applicable to a speech recognition apparatus for use in situations where there is a need to obtain voice information from some other place but generating sounds is not desirable, such as during a conference. However, in this specification, a description will be given taking a speech recognition apparatus designed for the hearing impaired as an example, since we believe it to be the most appropriate example.

In the above-described speech recognition device that displays recognized speech signals, the recognized signal needs to be transformed into visually recognizable form, and therefore, the sounds that are registered as standard patterns are limited to spoken words. For such a speech recognition device, a display device that can display characters is considered sufficient since the display need only display characters corresponding to spoken words.

If the speech recognition apparatus for the hearing impaired is to be designed only to assist them carry out conversations with people having the normal speech ability, the standard patterns registered will be limited to spoken words, and a display device that can display characters may be considered sufficient. However, from the viewpoint of presenting a broader range of sound information, it is desirable that the apparatus be also capable of presenting sound information other than spoken words.

SUMMARY OF THE INVENTION

It is an object of the present invention to provide a speech recognition apparatus that is also capable of presenting sound information other than spoken words in a visual form.

The speech recognition apparatus of the present invention comprises, as in a conventional speech recognition apparatus, sound input means for inputting a sound signal; feature extracting means for extracting features for recognition from the sound signal; standard feature pattern storing means for storing feature patterns of standard sound signals; comparing means for comparing the features of the input sound signal with the feature patterns stored in the standard feature pattern storing means, and for selecting a standard sound signal corresponding to the input sound signal; display pattern storing means for storing display information corresponding to the standard sound signals; and display means for displaying the display information corresponding to the standard sound signal selected by the comparing means. To achieve the above object, the standard feature pattern storing means stores feature patterns of standard nonspeech sound signals representing sounds other than speech sounds, as well as feature patterns of standard speech sound signals representing speech sounds, and the display pattern storing means stores speech sound display information representing the standard speech sound signals as characters and nonspeech sound display information corresponding to the standard nonspeech sound signals.

In the speech recognition apparatus of the invention, if a nonspeech sound signal, for example, a "siren" sound, is stored in the standard feature pattern storing means as a feature pattern of a standard nonspeech sound signal, a siren sound can be recognized. Furthermore, when a siren sound is recognized, display information "A siren is sounding", which is stored in the display pattern storing means as the nonspeech sound display information corresponding to the siren sound, is brought onto the display for viewing.

With the information "A siren is sounding," however, there is no knowing whether the message is spoken by a person or a "siren" sound is actually being heard. In this case, if a picture of a fire engine is displayed when a fire engine's siren sound is heard, it can provide a broader range of information.

BRIEF DESCRIPTION OF THE DRAWINGS

The present invention will be more clearly understood from the description as set forth below with reference to the accompanying drawings, wherein:

FIGS. 4A to 4D are diagrams showing examples of display patterns for nonspeech sounds;

DESCRIPTION OF THE PREFERRED EMBODIMENTS

Figure 1:
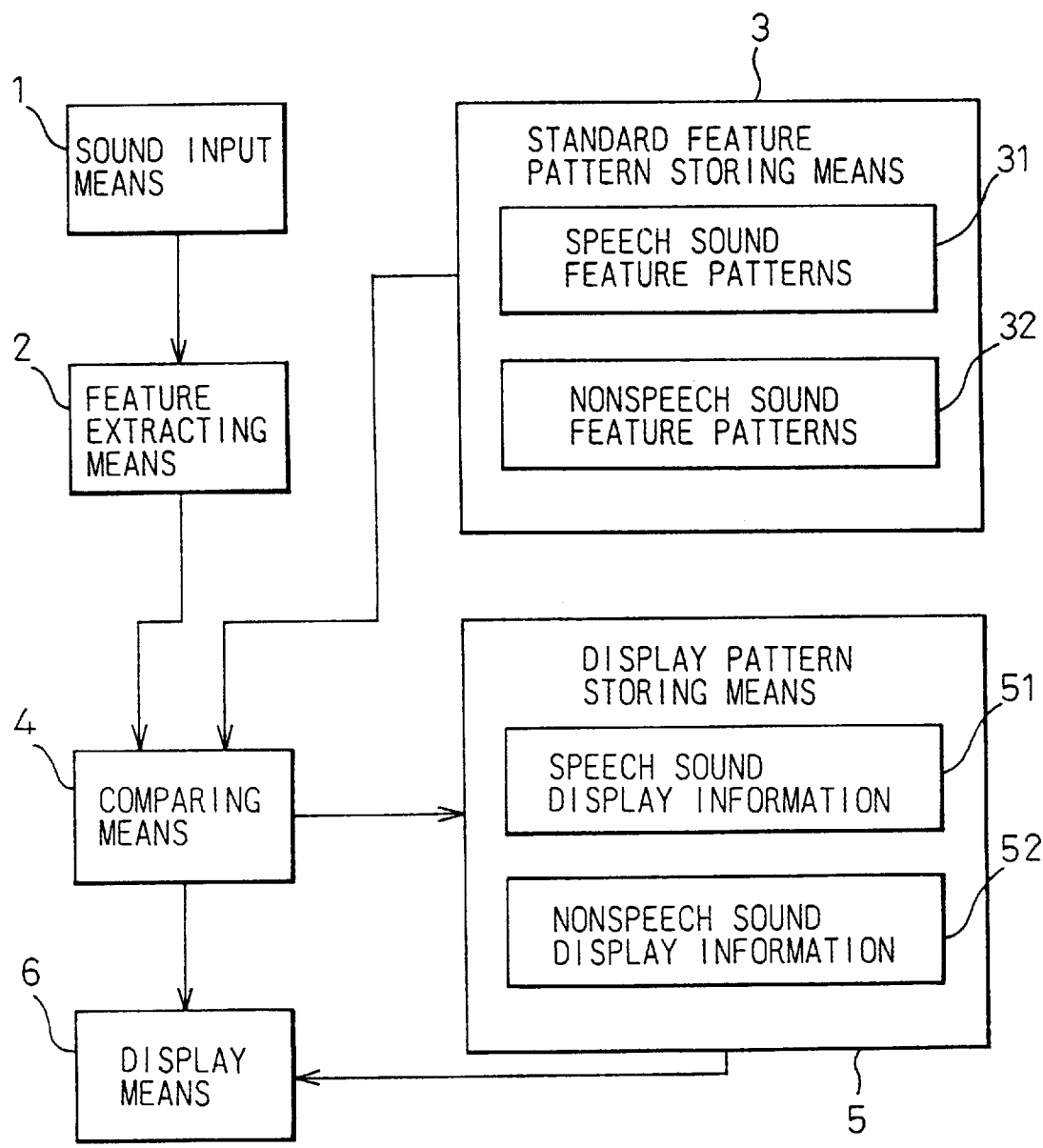
FIG. 1 is a block diagram showing the basic configuration of a speech recognition apparatus according to the present invention.

FIG. 1 is a block diagram showing the basic configuration of a speech recognition apparatus according to the present invention.

In FIG. 1, the reference numeral 1 is a sound input means for inputting a sound signal; 2 is a feature extracting means for extracting features for recognition of the sound signal; 3 is a standard feature pattern storing means for storing feature patterns of standard sound signals; 4 is a comparing means for comparing the extracted features of the input sound signal with the feature patterns stored in the standard feature pattern storing means 3, and for selecting a standard sound signal corresponding to the input sound signal; 5 is a display pattern storing means for storing display information corresponding to the standard sound signals; and 6 is a display means for displaying the display information corresponding to the standard sound signal selected by the comparing means 4. The standard feature pattern storing means 3 stores feature patterns 31 of standard speech sound signals representing speech sounds, and also stores feature patterns 32 of standard nonspeech sound signals representing sounds other than speech sounds. The display pattern storing means 5 stores speech sound display information 51 representing the standard speech sound signals as characters, and also stores nonspeech sound display information 52 corresponding to the standard nonspeech sound signals.

Figure 2:
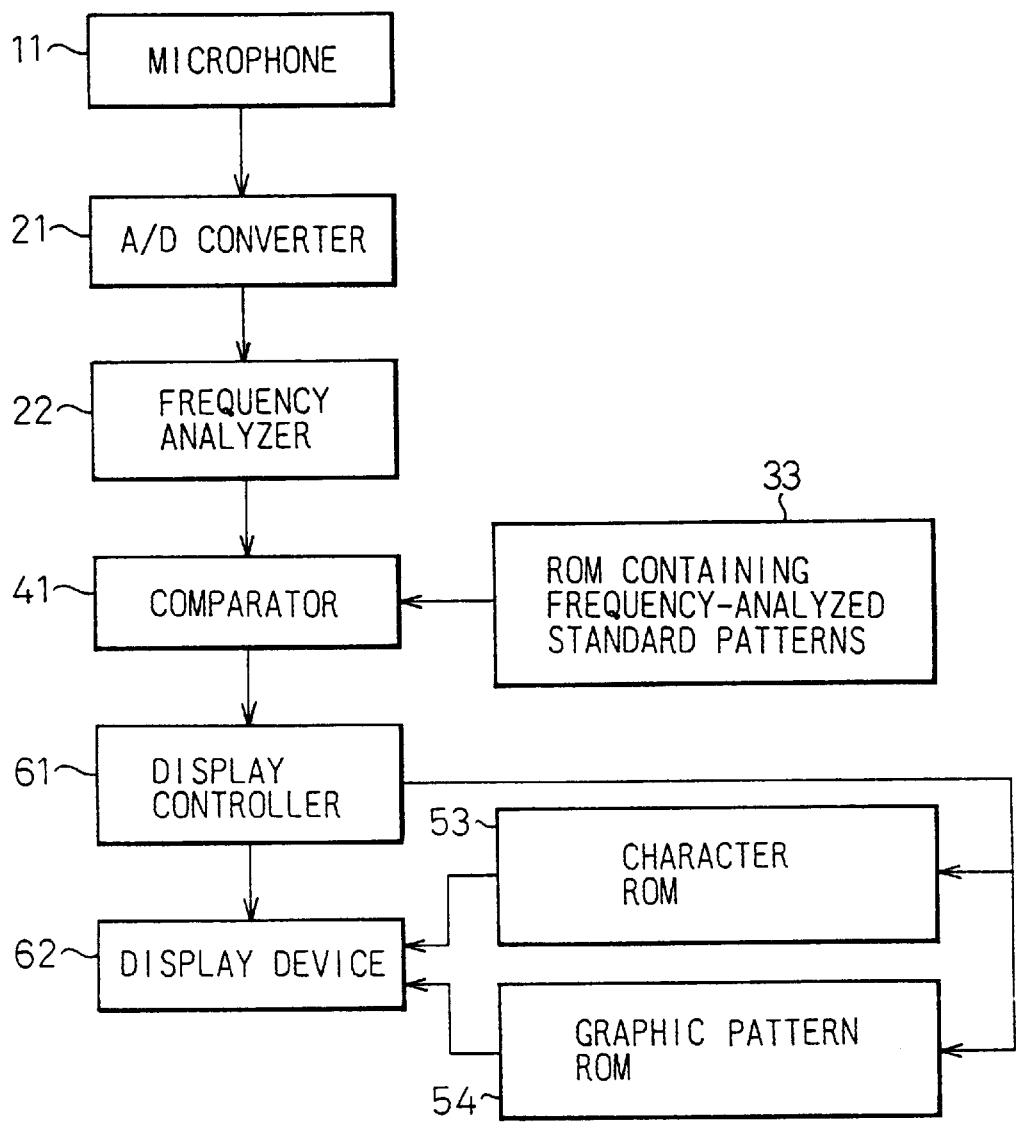
FIG. 2 is a block diagram showing the configuration of an apparatus according to one embodiment of the present invention.

FIG. 2 is a block diagram showing the configuration of a speech recognition apparatus for the hearing impaired according to one embodiment of the invention.

In FIG. 2, the reference numeral 11 is a microphone for converting a sound signal into an electrical signal; 21 is an A/D converter for sampling the electrical signal from the microphone 11 at a sampling frequency of 12 kHz, for example, for conversion into a digital signal; and 22 is a frequency analyzer. The frequency analyzer 22 analyzes the frequencies of the A/D converted time-series digital signal sequence at intervals of 10 ms by using fast Fourier transform (FFT) or other techniques, and obtains the power in each of eight frequency bands—the entire frequency range is divided into eight smaller bands based on auditory sensation—thus obtaining a time series of frequency feature parameters. The numeral 33 is a ROM containing standard patterns; time-series sets of frequency feature parameters for signals used for recognition, obtained in advance using the microphone 11, A/D converter 21, and frequency analyzer 22, are contained in this ROM. In this specification, the time-series sets of the frequency feature parameters for the signals used for recognition are called the standard patterns. The numeral 41 is a comparator which, using a technique such as DP matching, compares the time series (input pattern) of frequency feature parameters for an input sound signal with the standard patterns, and selects a standard pattern that provides the closest match with the input pattern. The numeral 53 is a character ROM holding character display patterns, and 54 is a graphic pattern ROM holding graphic display patterns such as pictures. Further, 61 is a display controller, and 62 is a display device such as a CRT, liquid-crystal display, or the like.

The number of kinds of standard patterns that can be stored in the standard pattern ROM 33 is determined by the capacity of the standard pattern ROM 33 and the processing capability of the comparator 41. The larger the capacity of the standard pattern ROM 33 is, the more kinds of standard patterns can be stored. This, however, increases the amount of computation required for the comparison with an input pattern; that is, as the kinds of standard patterns increase in number, it takes a longer time from the moment a sound signal is input, to the moment it is recognized and displayed. Therefore, how many kinds of standard patterns should be stored is determined in consideration of the processing capability of the comparator 41. In the present embodiment, several tens of spoken messages necessary in daily life, such as "Good Morning," "Meal is ready," etc., and several kinds of nonspeech sounds, such as a fire engine's siren sound, a baby's crying, etc., are stored as standard patterns.

The comparator 41 is actually a computer, and using a technique of DP matching, locates a standard pattern close to the input pattern. The DP matching technique will be briefly described below.

Figure 3:
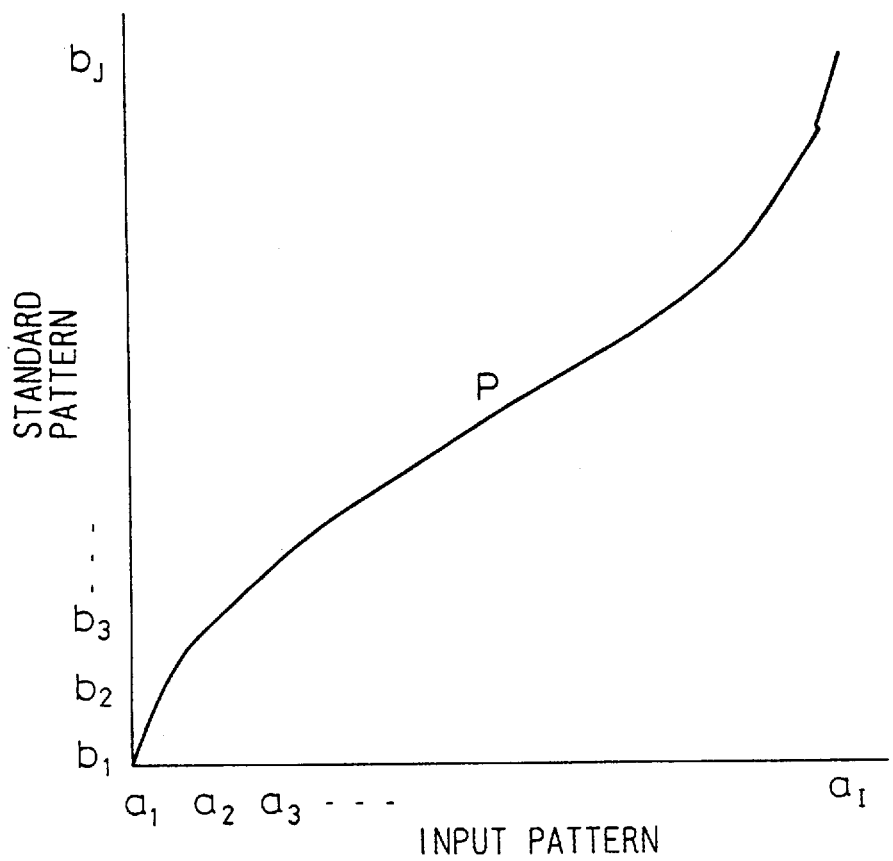
FIG. 3 is a diagram for explaining DP matching.

FIG. 3 is a diagram showing the concept of DP matching. In the figure, $a_1, a_2, a_3, \ldots$ are a time series of the frequency feature parameters for the input, and $b_1, b_2, b_3, \ldots$ a time series of the frequency feature parameters for the standard patterns. First, in DP matching, the time axis is converted so that the frequency feature parameter time series for the input and standard patterns match as closely as possible and, then, the distance between the two is obtained. More specifically, if the path P shown on the graph is the optimal path, the difference between corresponding a and b at each point on P is calculated, and the sum of the differences calculated at all the points on P is taken as the distance between the input and the standard pattern. The distances from all standard patterns are obtained in this manner, and the standard pattern to which the input is the closest in distance is determined as the result of the recognition.

Of the standard patterns, the standard nonspeech patterns are contained in the graphic pattern ROM 54 as graphic information associated with the graphics images of an fire engine, a crying baby, etc.

The display controller 61 produces a display corresponding to the closest matching standard pattern on the display device 62 in accordance with the result of the comparison fed from the comparator 41. When the standard pattern to be displayed represents a speech sound, the display controller 61 reads the codes of the character string to be displayed and the pattern of each character from the character ROM 53, assembles them, and outputs the resulting video signal to the display device 62. Alternatively, the character ROM 53 may be constructed to contain the patterns of the character strings corresponding to the standard patterns; in such a case, the display controller 61 can be simplified in construction.

When the input signal is a nonspeech sound signal, character information or a graphics display pattern indicating that such and such a sound is being heard is displayed. FIGS. 4A to 4D show such examples.

FIGS. 4A and 4B show examples in which when the input signal is a nonspeech sound signal, information indicating that such and such a sound is being heard is displayed using characters, while FIGS. 4C and 4D show examples in which the related graphic display patterns are displayed. FIGS. 4A and 4C show that a siren is sounding, and FIGS. 4B and 4D show that a baby is crying. As previously noted, when displaying characters to describe a particular situation, the problem is that there is no knowing whether the displayed message represents what someone actually said or what actually happened. It is therefore desirable that either the convention be set that a graphic pattern is used when the input signal is a nonspeech signal, or, in the case of a message such as shown in FIGS. 4A and 4B, an additional indication be displayed along with the message, to indicate that the message is not a spoken message.

Figure 5:
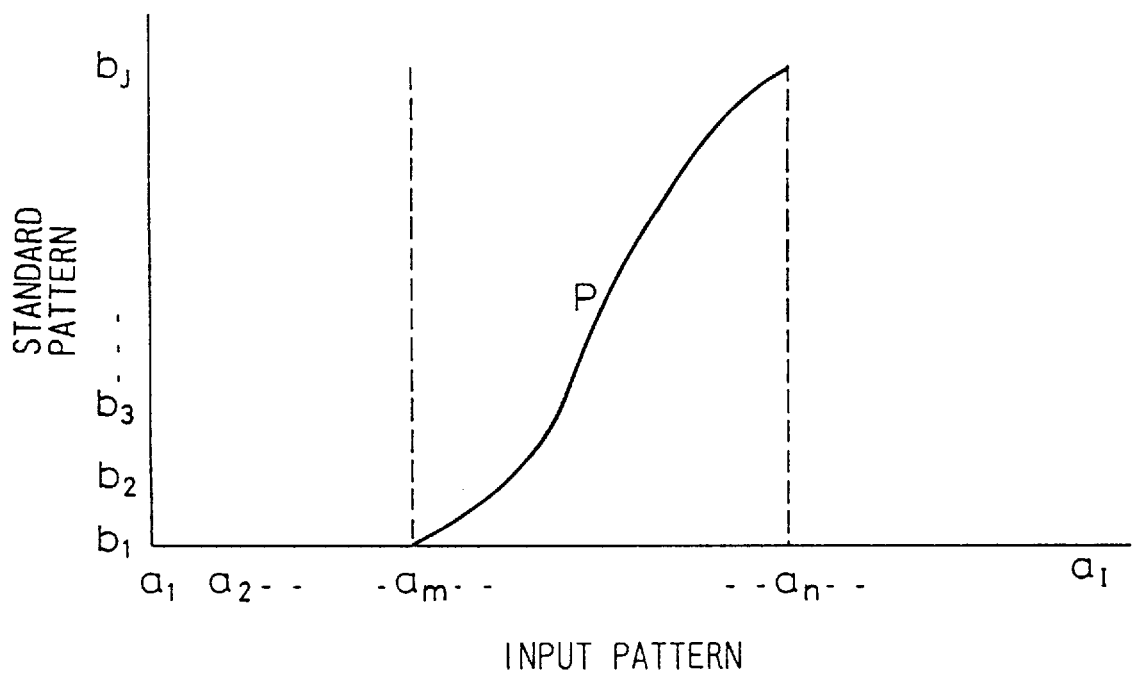
FIG. 5 is a diagram for explaining a modified example of DP matching.

In the above-described embodiment of the present invention, the comparator 41 has been described as performing the comparison by calculating the difference between a and b at each point on the path P along the input frequency feature parameter time series and standard pattern frequency feature parameter time series, and then summing the differences at all points on P to determine the distance. However, instead of taking the sum for all points as the distance, it is possible to obtain the distance, as shown in FIG. 5 as a modified example, without fixing the start point and end point at position $a_1$, and $a_I$ of the input pattern. In the illustrated example, $a_m$ and $a_n$ are taken as the start point and end point, respectively. Thus, a standard pattern having the smallest distance from the thus limited range of the input pattern is obtained and determined as the result of the recognition.

The sound to be recognized is captured by a microphone; however, there are cases in which the microphone captures a plurality of sounds simultaneously because there are a plurality of sound sources. In such cases, if the captured sounds are directly compared with the standard patterns, it will be difficult to find the matching standard pattern. Therefore, in such cases, a plurality of directional microphones with different directivities are used, for example, and the input signals in the respective microphones are compared; when they match, the comparison process is performed by recognizing the sound source as being the same, and when the input signal in each microphone does not match each other, then it is determined that there are different sound sources, and the comparison process is performed on the sound signal from each sound source.

Figure 6A:
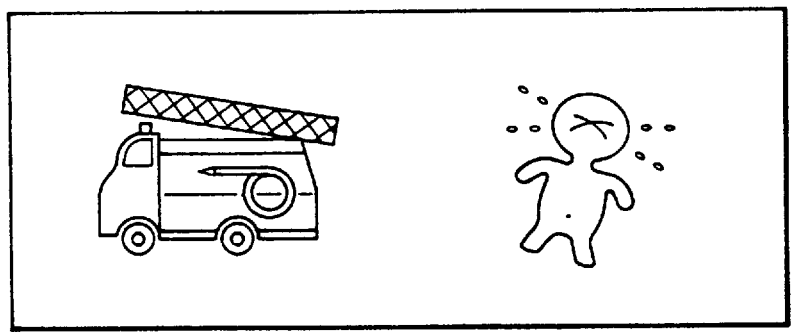
FIGS. 6A and 6E are diagrams showing modified examples of display patterns for nonspeech sounds.

When a plurality of sound signals are recognized, the recognized sound signals need to be displayed simultaneously. For example, when a set of words spoken by a person and a fire engine's siren sound are recognized simultaneously, the set of words is displayed as characters, along with a picture of a fire engine. Likewise, when a fire engine's siren sound and baby's crying are recognized simultaneously, a picture of a fire engine and a picture of a crying baby are displayed simultaneously. Such a display example is shown in FIG. 6A.

Figure 6B:
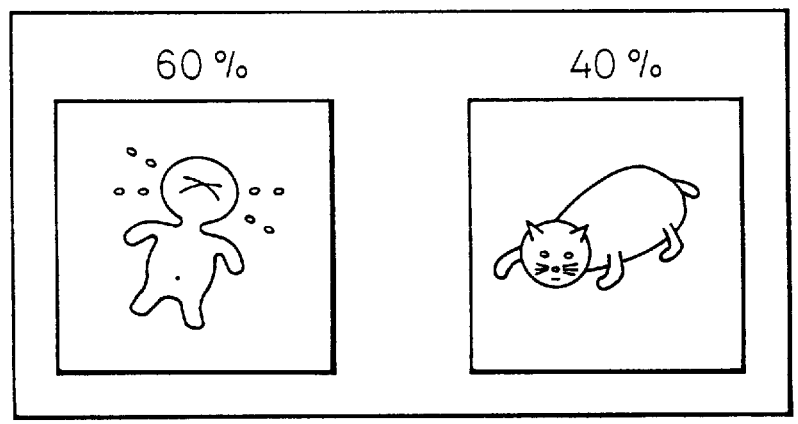

Furthermore, there may be cases in which a plurality of standard patterns having similar distances are found as a result of the comparison in the comparator 41. In such cases, it is dangerous to simply select the closest pattern among them. Accordingly, in such cases, a modified display is produced by, for example, displaying a plurality of possible standard patterns at the same time. An example of such a display is shown in FIG. 6B, in which when it is not possible to perfectly distinguish between a baby's crying and a cat's meowing, a picture of a crying baby and a picture of a cat are displayed simultaneously with their probabilities being shown alongside in accordance with the result of the recognition.

As described, using the above apparatus it is possible to recognize nonspeech sounds as well as speech sounds and display the related information for viewing. For recognizing and displaying spoken words, the apparatus is used only when the user carries out conversation with the speaker, and therefore, the user has only to view the screen when necessary. On the other hand, in the case of sounds other than spoken words, there is no knowing when such sounds will be input. Therefore, the apparatus is left on at all times, and the display is produced when an input of such a sound is recognized. However, there is a problem in that the user may not recognize that the input of such a sound has been made. Furthermore, we cannot expect the user to watch the screen at all times. Therefore, when an input of a particular sound other than human speech sound is recognized, the user is notified of the input by other means than a sound or display, for example, by vibrations, etc. If such an apparatus is used to assist the hearing impaired, and if notification is made by vibrations when a fire engine's siren sound is recognized, for example, it will greatly contribute to the safety of the hearing impaired.

As described above, using the speech recognition apparatus of the present invention, not only human speech is recognized and displayed as characters, but also other sounds than human speech can be recognized and the matching information can be displayed. When such an apparatus is used to assist the hearing impaired, information on surrounding sounds as well as spoken words can be presented to the hearing impaired person.

I claim:
1. A speech recognition apparatus comprising:
sound input means for inputting a sound signal;
feature extracting means for extracting features for recognition of the sound signal;
standard feature pattern storing means for storing feature patterns of standard nonspeech sound signals representing sounds other than human speech sounds, as well as feature patterns of standard speech sound signals representing human speech sounds;
comparing means for comparing the extracted features of the input sound signal with the feature patterns stored in the standard feature pattern storing means, and for selecting a standard sound signal corresponding to the input sound signal;
display pattern storing means for storing speech sound display information representing the standard speech sound signals as characters and nonspeech sound display information corresponding to the standard nonspeech sound signals; and
display means for displaying display information corresponding to the standard sound signal selected by the comparing means.

2. A speech recognition apparatus according to claim 1, wherein the nonspeech sound display information is image information, and the display means displays image information.

3. A speech recognition apparatus according to claim 2, wherein the image information of the nonspeech sound display information includes moving image information, and the display means displays moving image information.

4. A speech recognition apparatus according to claim 1, further comprising notifying means for notifying by means other than sounds when information is displayed on the display means.

5. A speech recognition apparatus according to claim 1, wherein the comparing means outputs the result of comparison with a ranking thereof determined according to a degree of agreement between the extracted features of the input sound signal and the feature patterns stored in the standard feature pattern storing means, and the display means displays a plurality of display information items corresponding to the standard sound signals that fall within a prescribed degree of agreement.

6. A speech recognition apparatus according to claim 1, wherein when the comparing means detects a plurality of standard sound signals being input simultaneously, the display means displays a plurality of display information items.

* * * * *